United States Patent [19]
Crosswy

[11] Patent Number: 5,426,767
[45] Date of Patent: Jun. 20, 1995

[54] METHOD FOR DISTINGUISHING BETWEEN A 286-TYPE CENTRAL PROCESSING UNIT AND A 386-TYPE CENTRAL PROCESSING UNIT

[75] Inventor: William C. Crosswy, Houston, Tex.

[73] Assignee: Compaq Computer Corporation, Houston, Tex.

[21] Appl. No.: 630,377

[22] Filed: Dec. 18, 1990

Related U.S. Application Data

[63] Continuation of Ser. No. 81,301, Aug. 3, 1987, abandoned.

[51] Int. Cl.6 ............................................. G06F 15/78
[52] U.S. Cl. .................................... 395/500; 364/264; 364/264.1; 364/264.5; 364/259.3; 364/DIG. 1; 395/700
[58] Field of Search ... 364/200 MS File, 900 MS File; 395/500, 700; 371/20.1, 15.1

[56] References Cited

U.S. PATENT DOCUMENTS

| | | | |
|---|---|---|---|
| 3,740,645 | 6/1973 | Cook | 371/25.1 |
| 4,042,914 | 8/1977 | Curley | 364/200 |
| 4,287,594 | 9/1981 | Shirasaka | 371/20 |
| 4,354,268 | 10/1982 | Michael | 371/15.1 |
| 4,360,870 | 11/1982 | McVey | 395/275 |
| 4,380,070 | 4/1983 | Steiner | 371/20 |
| 4,397,021 | 8/1983 | Lloyd | 371/15.1 |
| 4,458,357 | 7/1984 | Weymouth et al. | 365/236 |
| 4,484,329 | 11/1984 | Slamka | 371/25.1 |
| 4,497,056 | 1/1985 | Sugamori | 371/20 |
| 4,523,312 | 6/1985 | Takeuchi | 371/25.1 |
| 4,546,472 | 10/1985 | Volt et al. | 371/15 |
| 4,567,592 | 1/1986 | Minicilli | 371/20 |
| 4,598,401 | 7/1986 | Whelan | 371/22.4 |
| 4,677,548 | 6/1987 | Bradley | 364/200 |
| 4,703,359 | 10/1987 | Rumbolt et al. | 340/825.69 |
| 4,727,477 | 2/1988 | Gavril | 364/200 |
| 4,727,491 | 2/1988 | Culley | 364/200 |
| 4,752,907 | 6/1988 | Si et al. | 364/900 |
| 4,763,242 | 8/1988 | Lee | 364/200 |
| 4,768,195 | 8/1988 | Stoner et al. | 371/25 |
| 4,771,428 | 9/1988 | Acuff | 371/25.1 |
| 4,775,931 | 9/1988 | Dickie | 395/275 |
| 4,791,359 | 12/1988 | Raymond et al. | 371/20 |
| 4,821,179 | 4/1989 | Jensen | 395/275 |
| 4,845,712 | 7/1989 | Sanner | 371/25.1 |
| 4,888,715 | 12/1989 | Tada | 371/25.1 |
| 4,899,306 | 2/1990 | Greer | 371/16.1 |
| 4,964,074 | 10/1990 | Suzuki | 395/500 |

OTHER PUBLICATIONS

Smith, "Chips in Transition", PC Tech Journal, Apr. 1986, pp. 56–69.
MC68020 32 bit Microprocessor Users Manual, 2nd Ed., Prentice Hall, Englewood Cliffs, N.J., 1985, pp. D-6, D-7.
IBM Tech. Discl. Bull. vol. 22, No. 3 Aug. 1979 "Programmable Identification for I/O Devices", J. M. McVey, pp. 882 and 883.
MC68020 32 bit Microprocessor User's Manual, 2nd Ed, 1985 Motorola Inc., Prentice Hall Pub. pp. A-2, A-4, B-167.

Primary Examiner—Eric Coleman
Attorney, Agent, or Firm—Vinson & Elkins

[57] ABSTRACT

A method is disclosed for distinguishing between the Intel 80386 and 80286 CPUs. Bits 12, 13, and 14 of the 386 flags word in the real mode are always zero in the 286 architecture and cannot be set, but can be set to a one on the 386. The method includes the steps of attempting to set any of those bits and examining the results. A source code listing is attached.

3 Claims, 2 Drawing Sheets

METHOD FOR DISTINGUISHING BETWEEN A 286-TYPE CENTRAL PROCESSING UNIT AND A 386-TYPE CENTRAL PROCESSING UNIT

The present application is a continuation of application Ser. No. 081,301, filed Aug. 3, 1987, now abandoned.

BACKGROUND OF THE INVENTION

This invention relates to a method for detecting whether the CPU of a "Intel 86"-family computer system is an 80386 ("386") or an 80286 ("286"). The 386 and 286 CPUs are described in detail in publications by and available from Intel Corporation, Santa Clara, Calif., including the "Intel 80386 Hardware Reference Manual," Order No. 231732-1, the "Intel 80386 Programmer's Reference Manual," Order No. 230985-1, and the "Intel 80386 System Software Writer's Guide," Order No. 231499-1, to which reference is hereby made.

SUMMARY OF THE INVENTION

In accordance with the present invention, a method is disclosed for distinguishing between the 386 and 286 CPUs. The NT bit flag (i.e., bit 14) and the IOPL bits (bits 12 and 13) of the 386 flags word are always zero in the 286 architecture and cannot be set, but can be set to a one on the 386. The method includes the steps of attempting to set any of bits 12, 13, or 14 and examining the results.

DETAILED DESCRIPTION OF SPECIFIC EMBODIMENTS

A method in accordance with the invention includes the steps of (1) creating an image of the flags word of the CPU; (2) setting the NT and IOPL bits in the image; (3) up-dating the flags word with the contents of the image; (4) updating the image with the new contents of the flags word; and (5) determining whether any of the NT bit or the IOPL bits in the updated image is set. If such bit was successfully set, the CPU is a 386, otherwise a 286.

Figure 1:
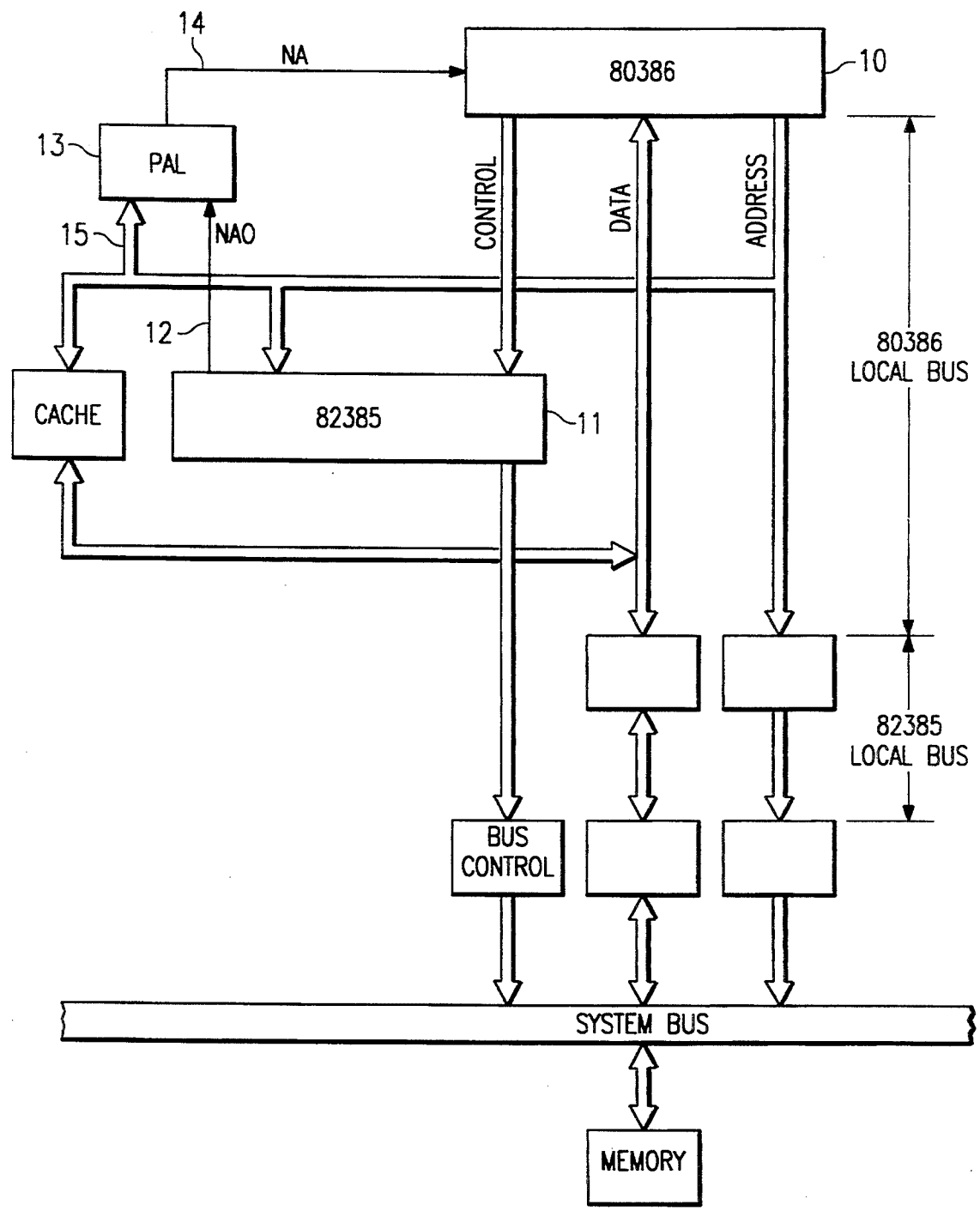
FIG. 1 is copy of commented source code of an assembly language routine for practicing the invention.
Figure 2:
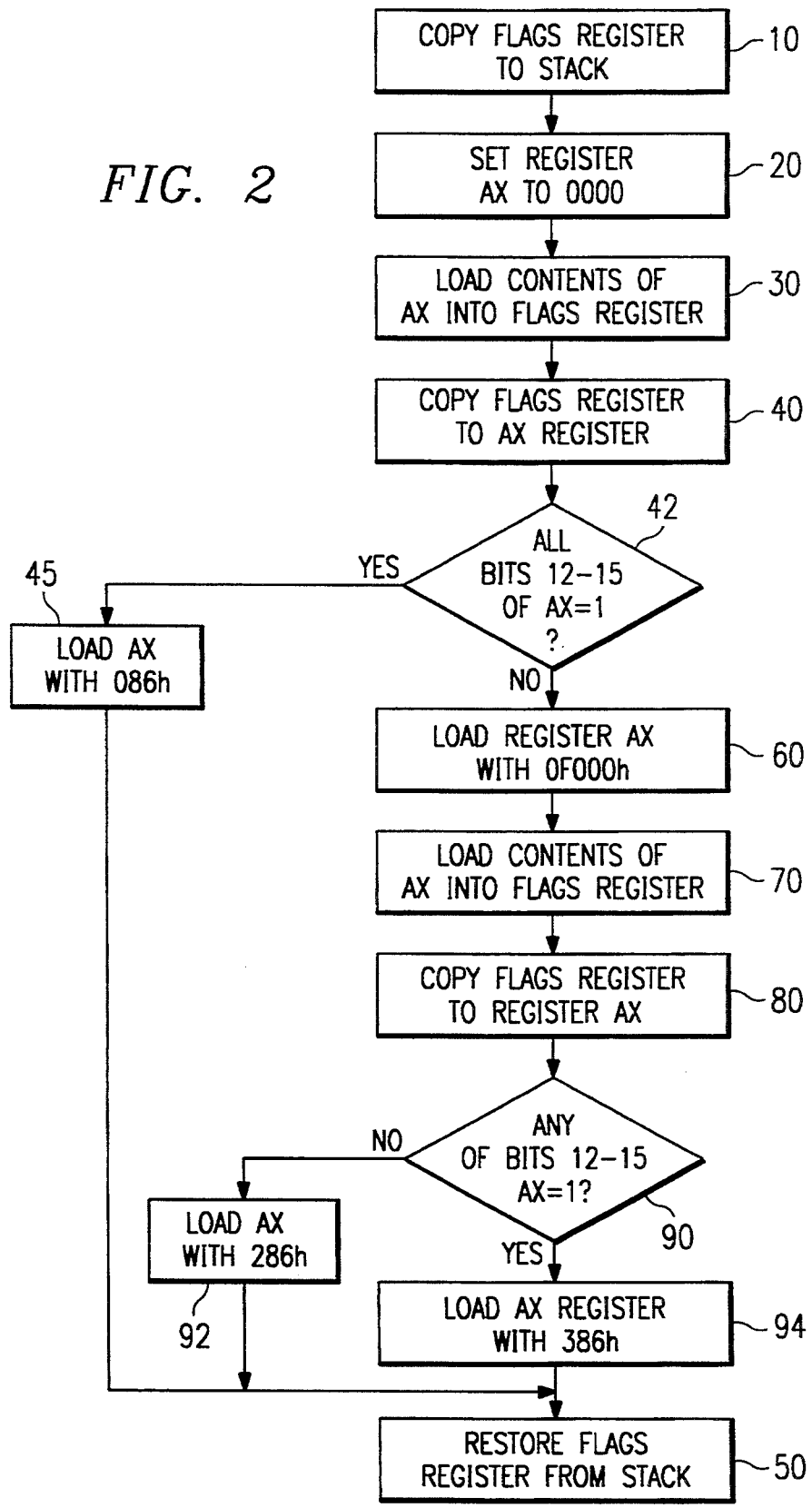
FIG. 2 is a flow chart of the assembly language routine of FIG. 1.

Referring now to FIGS. 1 and 2, the operation of the method according to the preferred embodiment of the invention will now be described. FIG. 1 is a listing of the code according to the preferred embodiment of the invention, using the well-known mnemonics for the assembly language instruction set of microprocessors manufactured and sold by Intel Corporation, such as the 80286 and 80386 microprocessors. FIG. 2 is a flow chart of the code of FIG. 1; the following description will be directed to the flow chart of FIG. 2.

In process 10, the contents of the flags register of the microprocessor are pushed onto the stack of the microprocessor. Process 20 sets the contents of the general purpose register AX to all zeroes. In process 30, the contents of the AX register are loaded into the flags register; as listed in FIG. 1, this is accomplished by pushing the contents of the AX register onto the stack, followed by popping the contents of the top register in the stack into the flags register. Process 40 begins the process of examining the contents of the flags register by pushing the contents of the flags register onto the stack, and popping the top register in the stack into register AX. Process 42 examines bits 12 through 15 of register AX by performing the logical AND of the contents of the AX register with the value 0F00Ch, and comparing the result to the value 0F000h. If the result of the comparison indicates that none of bits 12 through 15 of the flags register were set to zero in process 30, the microprocessor is neither an 80286 nor an 80386, but instead is an 8086 or 8088. Process 45 loads register AX with the value 086h (indicating that the microprocessor type is neither an 80286 nor an 80386); control then passes to process 50 for restoration of the flags register with its prior contents, which were stored in the stack via process 10.

If the result of process 42 indicates that all of bits 12 through 15 of register AX were zero after process 30, process 60 next loads register AX with the value 0F000h, placing ones in bits 12 through 15 thereof and zeroes in all other bit locations. Process 70 loads the flags register with the contents of the AX register by pushing the contents of register AX into the stack, and by popping the top stack register into the flags register. Process 80 next copies the contents of the flags register into register AX, by pushing the flags register contents onto the stack and popping the top stack register contents into register AX. Process 90 tests the value of the bits 12 through 15 to see if any were set to one; this is done in the code of FIG. 1 by performing the logical AND of register AX with the value 0F000h, and conditionally branching on a zero result. If none of the bits were set to one (i.e., the logical AND returned a zero result), the microprocessor is of the 80286 type because the flags register bits 12 through 15 could not be set to one; in this event, process 92 loads register AX with the result 286h, and the flags register contents are restored by process 50. If any of the bits were set to one by process 70 (i.e., the logical AND did not have a zero result), indicating that the microprocessor is of the 80386 type, process 94 sets register AX to the value 386h in process 94, and the prior contents of the flags register are restored therein in process 50.

After performing the routine of FIGS. 1 and 2, the contents of the AX register may be examined in conventional fashion, to read the result of the method of FIGS. 1 and 2 of operating the microprocessor to identify its type.

The method may also include making a determination whether the CPU is an 8088 or 8086 (also by Intel). Such a determination may be made, for example, by examining the MSB (bit 15) of the flag word in the real mode, which is always a one on the 8086 and 8088 and always a zero on the 286 and 386. The method of making the determination is not claimed as a part of the present invention.

What is claimed is:

1. A method for operating a CPU to determine its type, said CPU selected from a group including 386 type microprocessors and 286 type microprocessors, comprising the steps of:
    performing a load operation to the flags register of said CPU with a selected data word; and
    after said step of performing a load operation, testing a specified bit of the CPU's flags register, said specified bit being any of bits 12, 13 or 14, to determine if said specified bit was loaded with the corresponding bit in said selected data word as a result of said load operation or if said step of performing a load operation did not load said specified bit with the corresponding bit in said selected data word.

2. The method of claim 1, wherein said testing step comprises:
copying the contents of said flags register into a second register after said performing step; and
examining the bit of said second register corresponding to said specified bit.

3. A method of operating an integrated circuit logic device to determine its type by executing a computer program, said logic device selected from a group of logic device types comprising a first type corresponding to 386-type microprocessors and a second type corresponding to 286-type microprocessors, said method comprising the steps of:

performing a load operation to a flags register of said logic device with a selected data word, said flags register having a certain bit therein which is writable by said load operation for logic devices of the first type of said group of logic device types, and which is not writable by said load operation for logic devices of the second type of said group of logic device types; and testing said certain bit of said flags register to determine if said certain bit was written with the corresponding bit in said selected data word as a result of said load operation;

wherein said logic device is identified as of said first type or of said second type based on the result of sail testing step.

* * * * *

UNITED STATES PATENT AND TRADEMARK OFFICE
CERTIFICATE OF CORRECTION

PATENT NO. : 5,426,767

DATED : June 20, 1995

INVENTOR(S) : William Crosswy

It is certified that error appears in the above-identified patent and that said Letters Patent is hereby corrected as shown below:

In the drawings, sheet 1 of 2 consisting of Fig. 1, should be deleted to be replaced with the attached corrected Fig. 1, as shown on the attached page.

Signed and Sealed this

Ninth Day of July, 1996

*Attest:*

BRUCE LEHMAN

*Attesting Officer*     Commissioner of Patents and Trademarks

```
;**********************************************************************
; CPU_TYPE: - return types of processor: 8086/8088, )286, or 80386
;           This routine relies on Intel-approved code that takes advantage
;           of the documented behavior of the high nibble of the flag word
;           in the REAL MODE of the various processors. The MSB (bit 15)
;           is always a one on the 8086 and 8088 and a zero on the 286 and
;           386. Bit 14 (NT flag) and bits 13/12 (IOPL bit field) are
;           always zero on the 286, but can be set on the 386.
;
;           For future compatibility of this test, it is strongly recommended
;           that this specific instruction sequence be used. The exit codes
;           can of course be changed to fit a particular need.
;
;           CALLABLE FROM REAL MODE ONLY
;
; ENTRY: (none)
; EXIT:   AX = processor type: 0086h if 8086 or 8088
;                              0286h if 80286
;                              0386h if 80
; USED:   AX
; STACK:  6 BYTES
;----------------------------------------------------------------------
cpu_type    proc    near
            pushf
            xor     ax,ax
            push    ax
            popf                        ; 0000 into AX
            pushf                       ; try to put that in the flags
            pop     ax
            and     ax,0F000h           ; look at what really went into flags
            cmp     ax,0F000h           ; mask off high flag bits
            je      is_86               ; Q: was high nibble all ones?
            mov     ax,0F000h           ;    Y: it's an 8086 (or 8088)
            push    ax                  ;    N: try to set the high bits
            popf
            pushf                       ;        ...in the flags
            pop     ax
            and     ax,0F000h           ; look at actual flags
            je      is_286              ; Q: any high bits set?
is_386:                                 ;    N: it's an 80286
            mov     ax,0386h
            jmp     short ct_exit       ;    Y: 80386
is_286:
            mov     ax,0286h
            jmp     short ct_exit       ; 80286
is_86:
            mov     ax,0086h
ct_exit:                                ; 8086 or 8088
            popf
            ret                         ; restore original flags
cpu_type    endp                        ; *** RETURN ***
```

FIG. 1